United States Patent [19]
Pfister et al.

[11] Patent Number: 5,718,125
[45] Date of Patent: Feb. 17, 1998

[54] ELECTRICALLY OPERATED VALVE AND CONTROL ASSEMBLY FOR SMALL SORPTION REFRIGERATION/FREEZERS

[75] Inventors: Dennis M. Pfister, Conway; Charles M. Byrd, Maumelle; Tom Rand, Conway, all of Ark.

[73] Assignee: Rocky Research, Boulder City, Nev.

[21] Appl. No.: 677,083

[22] Filed: Jul. 9, 1996

[51] Int. Cl.[6] .................. F25B 41/06; F25B 17/08; F16K 51/00
[52] U.S. Cl. .................. 62/527; 62/480; 251/153
[58] Field of Search .................. 62/476, 101, 480, 62/527; 251/153; 137/457, 468

[56] References Cited

U.S. PATENT DOCUMENTS

| | | | |
|---|---|---|---|
| 4,269,042 | 5/1981 | Williams | 62/511 |
| 4,976,117 | 12/1990 | Crozat et al. | 62/480 |
| 5,161,389 | 11/1992 | Rockenfeller | 62/480 |
| 5,402,652 | 4/1995 | Alsenz | 62/222 |

*Primary Examiner*—William Doerrler
*Attorney, Agent, or Firm*—Jerry R. Seiler

[57] ABSTRACT

A solenoid operated valve for supplying a liquid refrigerant has an inlet port, or outlet port and a valve port therebetween, the outlet port having a restricted opening equal to or smaller than the opening of the valve port, a capillary tube in the outlet port, and a passageway between the valve port and the outlet port having a small volume capable of substantially preventing expansion of liquid refrigerant.

23 Claims, 2 Drawing Sheets

ELECTRICALLY OPERATED VALVE AND CONTROL ASSEMBLY FOR SMALL SORPTION REFRIGERATION/FREEZERS

BACKGROUND OF THE INVENTION

A number of devices and methods exist for controlling refrigerant flow to the evaporator in refrigerator/freezer appliances. In cooling appliances such as refrigerators, freezers, or combined refrigerator/freezer units, the refrigerant expansion devices used are typically conventional components such as solenoid-controlled expansion valves, thermostatic expansion valves, passive devices such as capillaries and orifices, and pressure regulators, as well as the float control devices. In addition, electronic thermal expansion valves utilizing temperature sensors attached to the evaporator for determining operation of the valve to regulate refrigerant flow are also known. Small ammonia refrigerator/freezers, particularly those utilizing solid-vapor ammonia sorption reaction components, and especially cooling systems having relatively small capacity, require evaporator control devices and methods incorporating very small passageways which may become easily plugged, and require a high degree of evaporator control with minimal parasitic losses. None of the aforesaid conventional devices are adequate for such small ammonia freezer systems, particularly those employing the complex compound sorption systems having small capacities for example, below about 100 watts.

SUMMARY OF THE INVENTION

The solenoid operated valve and valve control assembly of the present invention is especially suitable for small complex compound chemisorption cooling apparatus, such as refrigerator/freezer appliances having a small capacity, even below about 100 watts. The valve assembly of the invention comprises a valve having a properly sized valve seat and incorporating a capillary feed tube. The valve body is constructed to minimize or eliminate expansion of the refrigerant thereby preventing parasitic cooling within the valve. The valve assembly also includes a capillary feed from the valve to the evaporator, the combined features of which allow the refrigerator/freezer appliance to be constructed with the valve outside of the freezer compartment, thereby obviating the requirement of insulating the valve to prevent parasitic losses or of installing the valve within the insulating barrier between the freezer interior and the sorber. Such construction also avoids any heating caused by solenoid operation and provides for increase in the available storage volume on the cold side of the system.

DETAILED DESCRIPTION OF THE PREFERRED EMBODIMENTS

Figure 1:
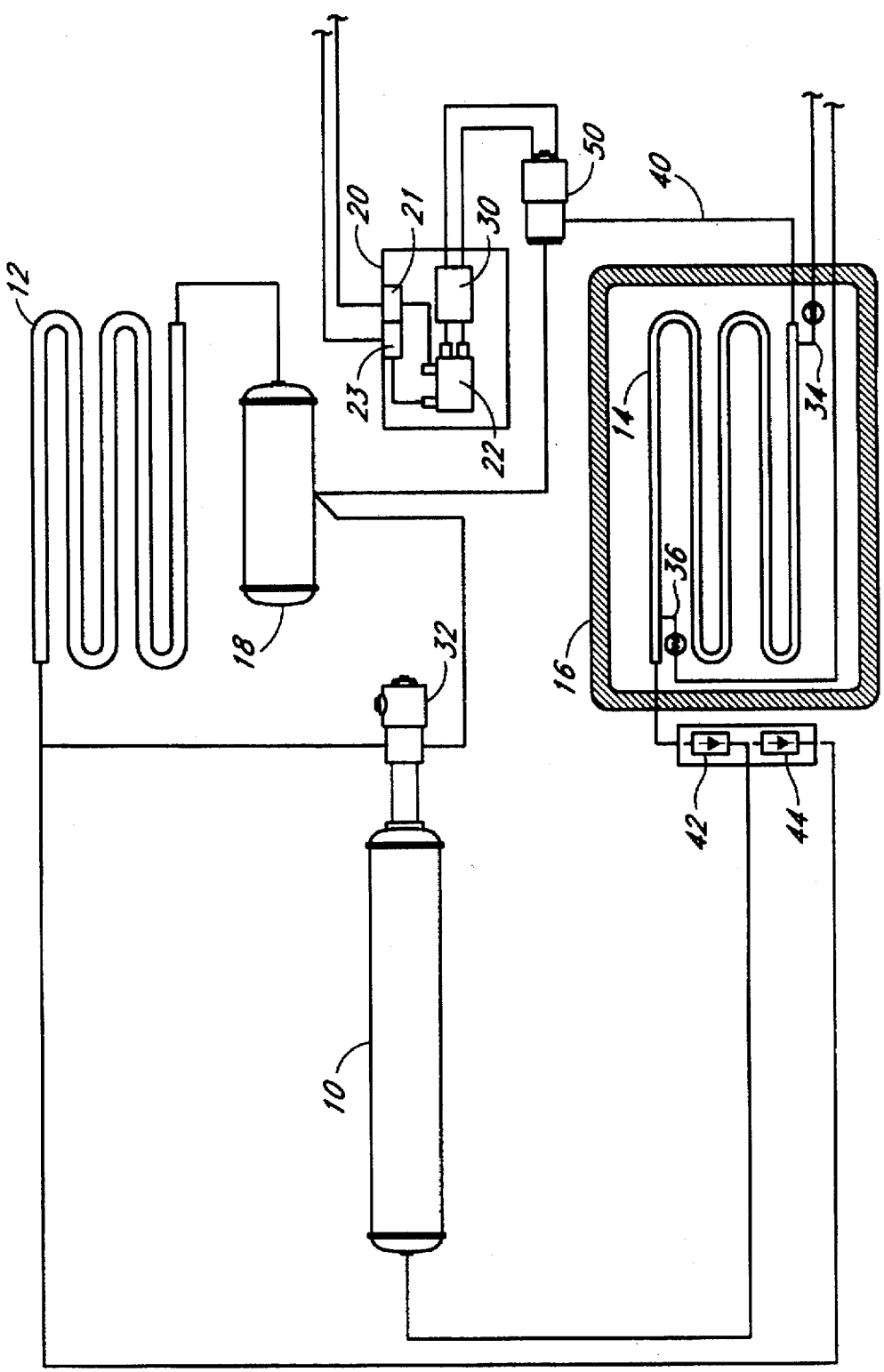
FIG. 1 schematically illustrates a solid-vapor reactor system suitable for a freezer/refrigerator and incorporating the valve and valve control assembly of the invention.

In FIG. 1 there is schematically illustrated a sorption refrigeration assembly comprising a sorber or reactor 10, a condenser 12, a receiver 18, and an evaporator 14 for cooling a freezer or refrigerator compartment 16. Sorber 10 contains a solid sorption composition capable of alternately adsorbing and desorbing a gaseous refrigerant. The solid sorbent may be any composition including the well-known inclusion compounds such as a zeolite, activated alumina, activated carbon, and silica gel or a metal hydride. Preferred sorbents are the complex compounds formed by adsorbing a polar gaseous refrigerant on a metal salt. Such complex compounds are disclosed in U.S. Pat. No. 4,848,994 and are incorporated herein by reference. Particularly preferred are the complex compounds formed by a process in which the density is optimized by restricting the volumetric expansion of the complex compound as disclosed in U.S. Pat. Nos. 5,298,231 and 5,328,671, the descriptions of which are incorporated herein by reference. Such complex compounds are capable of reaction rates substantially increased as compared to the reaction rates of complex compounds formed without such volumetric expansion restriction and density control. Such sorbents include the metal salts and complex compounds as well as mixtures thereof with the aforesaid inclusion compounds. The most preferred complex compounds are those disclosed in the aforesaid application in which ammonia is the refrigerant. In the aforesaid application there are also described improved solid-vapor sorption refrigerators/freezers comprising reactors in which a polar gaseous refrigerant is alternately adsorbed and desorbed on a metal salt or complex compound resulting from adsorption of the polar gas on the metal salt and incorporating improved valve systems for controlling refrigerant flow to the evaporator, the description of which is also incorporated herein by reference.

FIG. 1 schematically illustrates a preferred evaporator control system of the invention incorporating a microprocessor based controller 20 for actuating a solenoid for operating the valve 50. The controller includes temperature sensing means comprising temperature inlet and outlet gates 23 and 21, respectively, connected to thermistors 34 and 36 in the evaporator coil 14. Thermistor 34 monitors the temperature at the evaporator inlet and thermistor 36 monitors evaporator outlet temperature which temperatures are sensed by the controller. Where the assembly is to be periodically pulsed, the controller also includes a timer 22. A preferred controller also includes a microprocessor 30 programmed for precise evaporator flow control. Other components shown in FIG. 1 include a sorber let-down valve 32, adsorption check valve 42 and desorption check valve 44. Other components known to those skilled in the art may also be incorporated.

Figure 2:
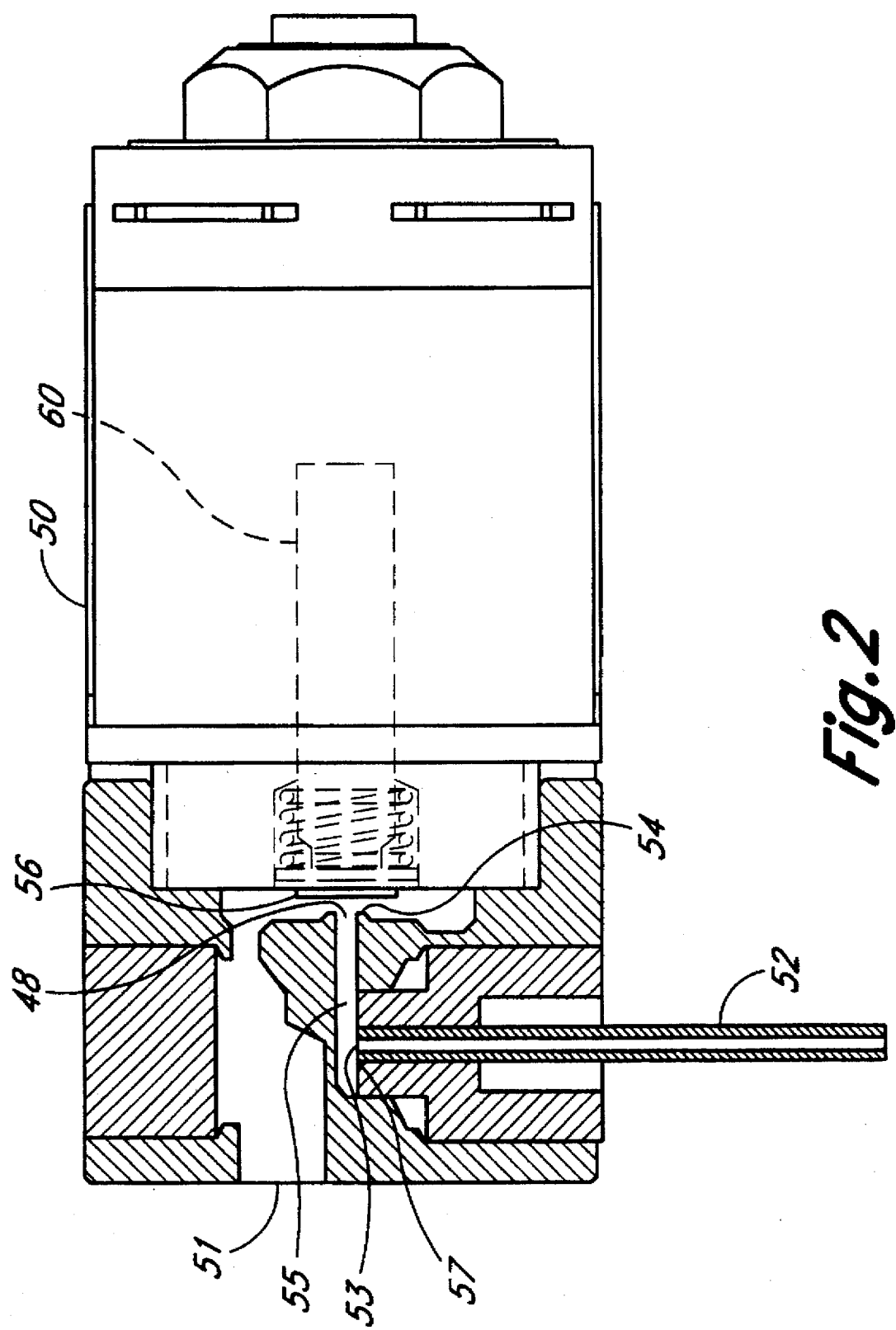
FIG. 2 is an enlarged view of the valve used in the valve assembly shown in FIG. 1.

The valve and valve control assembly of the present invention comprises a valve assembly having a liquid refrigerant inlet port and an outlet port separated by a valve seat, and a capillary tube secured in the valve assembly for directing liquid refrigerant from the outlet port to an evaporator. The internal cross-sectional area of the capillary tube is equal to or less than the cross-sectional area of the valve seat. The valve includes a passageway between the valve seat and the outlet port in which the capillary tube is secured, having a small volume for minimizing the expansion of the refrigerant. The small volume of the passageway substantially prevents vaporization of liquid ammonia present in the valve, thereby minimizing or eliminating parasitic cooling occurring within the valve body. As shown in FIGS. 1 and 2, the valve assembly 50 comprises a solenoid-operated electronic expansion valve incorporating a solenoid assembly which is well understood by those skilled in the art and need not be further discussed herein. Observing particularly FIG. 2, the important valve components comprise a refrigerant inlet port 51, an outlet port 57 and valve port 48 and a valve seat 54 therebetween. A valve stopper 56 on the end of the plunger 60 is operated by the solenoid for closing the valve port is shown. A capillary tube 52 is secured at the outlet port 57. The internal size or cross-sectional area 53 of the capillary tube 52 is smaller than the size of the area or cross-sectional diameter of the valve port 48 at the valve seat 54. Moreover, the flow area comprising the volume of the passageway 55 between the valve seat 54 and the capillary tube opening 53 is specifically limited in size such that expansion and vaporization of the refrigerant within the valve is substantially avoided. For a small 75 watt freezer, a typical valve seat diameter is 0.032 inch and uses a capillary tube ID of between about 0.020 and about 0.030 inch.

The interior of the valve prevents substantial vaporization of liquid refrigerant within the valve, particularly liquid ammonia, thereby minimizing parasitic cooling occurring within the valve body. Because of such a configuration, the valve may be located outside of the freezer compartment, or even built into the sorption reservoir thereby eliminating the need for insulation to prevent parasitic cooling. Moreover, such a valve is not required to be buried within the insulating barrier between the inside of the freezer and the reactor thereby further simplifying manufacturing and assembly and reducing apparatus costs and increasing the available cooling storage area.

A microprocessor-based controller may be programmed for controlling refrigerant flow to the evaporator in response to the two monitored evaporator temperatures by thermistors 34 and 36. It is desirable to maintain suitable separation between the evaporator inlet and outlet, with typical outlet temperatures between about −10° C. and about −20° C. and typical inlet temperature of about −30° C. Such microprocessor-controlled operation may be programmed to ensure that when the desired amount of superheat is reached, refrigerant flow is reduced until adequate temperature separation occurs. The electronic expansion valve with closed-loop temperature control is unable to distinguish between a flooded or near flooded evaporator and a starved evaporator approaching "dry-out". In both conditions evaporator outlet temperature approaches evaporator inlet temperature. To avoid such a problem, the valve may be periodically pulsed so that dry-out does not occur. Such pulsing of the valve for a predetermined time at the start of a sorption period is particularly important for a periodic sorption system to ensure that dry-out has not already occurred, which would prevent adequate temperature separation on the evaporator.

Other embodiments and configurations of the invention include closed-loop control logic of the valve to achieve a steady valve operation pattern that terminates at a pre-set limit or a variable pattern based on temperature differential. A relatively simple controller such as a Schmitt trigger comparator or a more complex system such as a controller including an analog to digital converter may be used. A mechanical relay actuated by temperature sensor differential may also be useful in certain applications, such as with a relatively restrictive capillary. Closed-loop valve control may also be based on a single temperature sensed on the evaporator or other useful location, for example, a freezer compartment. Yet other systems may comprise open-loop valve control for controlling refrigerant flow to the evaporator based on a predetermined time schedule that may or may not be coordinated with the overall system control. Yet other configurations comprise integrated open-loop flow scheduling with closed-loop override of the open-loop schedule. Multiple valves, each with a single capillary fed by a single reservoir may be used with the valves directing refrigerant at several points on one load, or at multiple cooling load applications. The valve may also be modified to feed multiple capillaries which direct refrigerant to several points on one load, or to multiple cooling loads or applications. Closed-loop control of the evaporator using a pressure sensor in place of the thermistors described herein may also be used.

We claim:

1. A solenoid operated valve assembly comprising a valve body having a liquid refrigerant inlet port and an outlet port, and a valve port therebetween, said outlet port including a restriction comprising an opening having a cross-sectional area equal to or smaller than the cross-sectional area of said valve port, a capillary tube secured in said outlet port, and including a passageway between said valve port and said outlet port, said passageway having a volume capable of substantially preventing the expansion of liquid refrigerant therein.

2. The valve assembly of claim 1 including control means for operating said solenoid operated valve in response to evaporator temperature.

3. The valve control assembly of claim 1 including control means comprising a timer for periodically actuating said solenoid operated valve.

4. The valve assembly of claim 2 wherein said control means includes one or more evaporator temperature monitors.

5. The valve assembly of claim 2 wherein said control means includes a first temperature monitor for sensing evaporator inlet temperature and a second temperature monitor for sensing evaporator outlet temperature.

6. The valve assembly of claim 4 wherein said control means includes a timer for periodically actuating said valve.

7. The valve assembly of claim 5 wherein said control means includes a timer for periodically actuating said solenoid operated valve.

8. The valve assembly of claim 2 wherein said control means comprises a microprocessor.

9. The valve assembly of claim 8 wherein said control means includes software means for actuating said solenoid valve for controlling evaporator temperature.

10. The valve assembly of claim 9 including one or more evaporator temperature monitors.

11. The valve assembly of claim 9 including a first temperature monitor for sensing evaporator inlet temperature and a second temperature monitor for sensing evaporator outlet temperature.

12. The valve assembly of claim 10 comprising control means including a timer for periodically actuating said solenoid valve.

13. A cooling apparatus comprising:

one or more adsorption reactors containing an adsorbent on which a refrigerant gas is alternately adsorbed and desorbed, a condenser for condensing said refrigerant gas, an evaporator and a cooling chamber in thermal exposure therewith, a solenoid operated valve assembly including a valve body having a liquid refrigerant inlet port and an outlet port, and a valve port therebetween, said outlet port including a restriction comprising an opening having a cross-sectional area equal to or smaller than the cross-sectional area of said valve port, and wherein said valve assembly includes a passageway between said valve port and said outlet port, said passageway having a volume capable of substantially preventing vaporization of liquid refrigerant therein.

14. The apparatus of claim 13 comprising a refrigerator/freezer appliance wherein said cooling chamber comprises a freezer compartment, said appliance having a capacity of 100 watts or less.

15. The apparatus of claim 14 wherein said valve assembly is mounted outside of said freezer compartment.

16. The apparatus of claim 14 including control means for operating said valve in response to evaporator temperature.

17. The apparatus of claim 16 wherein said control means includes a first temperature monitor for sensing evaporator inlet temperature and a second temperature monitor for sensing evaporator outlet temperature.

18. The apparatus of claim 16 wherein said control means includes a timer for periodically actuating said valve.

19. The apparatus of claim 16 wherein said control means comprises a microprocessor.

20. The apparatus of claim 19 wherein said control means includes software means for actuating said solenoid valve for controlling evaporator temperature.

21. The apparatus of claim 20 including one or more evaporator temperature monitors.

22. The apparatus of claim 20 including a first temperature monitor for sensing evaporator inlet temperature and a second temperature monitor for sensing evaporator outlet temperature.

23. The apparatus of claim 21 comprising control means including a timer for periodically actuating said solenoid valve.

* * * * *